United States Patent [19]

Inuma et al.

[11] Patent Number: 4,734,809
[45] Date of Patent: Mar. 29, 1988

[54] STABILIZING MEMBER FOR A FLEXIBLE DISC IN A RECORDING AND/OR REPRODUCING APPARATUS

[75] Inventors: Mitsumi Inuma, Kanagawa; Tsukasa Uehara, Tokyo, both of Japan

[73] Assignee: Canon Kabushiki Kaisha, Tokyo, Japan

[21] Appl. No.: 908,886

[22] Filed: Sep. 15, 1986

Related U.S. Application Data

[63] Continuation of Ser. No. 664,706, Oct. 25, 1984, abandoned.

[30] Foreign Application Priority Data

Oct. 27, 1983 [JP] Japan .................... 58-201521

[51] Int. Cl.$^4$ .................... G11B 15/60; G11B 5/012
[52] U.S. Cl. .................... 360/130.34; 360/99; 360/97; 360/105; 360/107; 360/130.3
[58] Field of Search .................... 360/97–99, 360/133, 102, 130.3–130.34, 105, 106, 107

[56] References Cited

U.S. PATENT DOCUMENTS

| | | | |
|---|---|---|---|
| 3,731,292 | 5/1973 | Kelley | 360/130.34 |
| 4,074,330 | 2/1978 | Norton et al. | 360/102 |
| 4,414,592 | 11/1983 | Losee et al. | 360/99 |
| 4,466,032 | 8/1984 | Saito | 360/130.34 |

FOREIGN PATENT DOCUMENTS

| | | | |
|---|---|---|---|
| 54-17708 | 9/1979 | Japan | 360/130.21 |
| 55-157161 | 12/1980 | Japan | 360/99 |
| 57-113459 | 7/1982 | Japan | 360/97 |
| 58-17519 | 2/1983 | Japan | 360/97 |
| 59-33666 | 2/1984 | Japan | 360/130.2 |

OTHER PUBLICATIONS

IBM Technical Disclosure Bulletin, vol. 6, No. 9, Feb. 1964, pp. 57–58, "Pressure Pad for Magnetic Heads", by Bond.
IBM Technical Disclosure Bulletin, vol. 18, No. 3, Aug. 1975, pp. 895–896, "Magnetic Disk Recording ... End-to-End", by Bowen

*Primary Examiner*—Stuart N. Hecker
*Assistant Examiner*—Alfonso Garcia
*Attorney, Agent, or Firm*—Toren, McGeady & Associates

[57] ABSTRACT

In a recording and/or reproducing apparatus of the kind having a recording and/or reproducing head arranged to be shiftable in the radial direction of a flexible disc, which is used as a record bearing medium, and a disc stabilizing member which is provided with a recessed part formed along the path of the movement of the head. The recessed part is formed to have a wider opening width at its portion located closest to the center of the disc than at its portion located closest to the outer periphery of the disc.

15 Claims, 12 Drawing Figures

STABILIZING MEMBER FOR A FLEXIBLE DISC IN A RECORDING AND/OR REPRODUCING APPARATUS

This is a continuation of application Ser. No. 664,706, filed Oct. 25, 1984 and now abandoned.

BACKGROUND OF THE INVENTION

1. Field of the Invention

This invention relates to a recording and/or reproducing apparatus and, more particularly, to an apparatus using a flexible disc as record bearing medium and having a stabilizing member which is situated opposite to a recording and/or reproducing head across the disc, for the purpose of keeping a satisfactory confronting relation between the disc and the head by stabilizing the portion of the flexible disc passing by the head.

2. Description of the Prior Art

Generally, the recording and reproducing performance of a recording and/or reproducing apparatus, of the kind using a flexible disc as record bearing medium, degrades when a recording or reproducing head (hereinafter referred to simply as the head) is brought close to the disc while the latter is rotating at a high speed, because of an air flow, which is caused by the rotation of the disc, disturbs a stable confronting relation between the head and the disc. In an effort to keep a stable confronting state between the head and the disc, therefore, it has recently been practiced to have a stabilizing member situated opposite to the head across the disc as shown in FIG. 1 of the accompanying drawings, in such a way as to have the air flow, caused by the rotation of the disc, not only between the disc and the head but also between the disc and the stabilizing member. According to the arrangement of the prior art, the stabilizing member is provided with a U-shaped groove or recessed part which is formed along a head feeding path for preventing the head from coming into contact with the stabilizing member through the disc. However, the width of the groove is unvarying throughout the entire length thereof as shown in FIG. 2. Meanwhile, in the case of a disc, such as a still picture video disc having a relatively large center core measuring as much as 15 mm in diameter while the disc diameter measures only 45 mm, for example, disc deformation, caused by the protruding position of the head, becomes uneven due to the influence of the center core as will be further described later with reference to FIG. 3. In this case, the confronting state between the stabilizing member and the disc varies and becomes uneven in the head feeding direction. Under such a condition, it has been hardly possible to insure a satisfactory recording or reproducing performance by keeping the head and the disc in a good confronted state at any radial head position relative to the disc.

SUMMARY OF THE INVENTION

The subject invention is directed to the solution of the above-stated problem of the recording and/or reproducing apparatus of the prior art using a flexible disc having a center core in the middle part thereof. It is thus an object of the invention to provide a recording and/or reproducing apparatus of this kind which ensures satisfactory recording or reproducing performance with simple means for obtaining a good confronting state between the head and the disc at any radially shifted position of the head relative to the flexible disc.

Under this object, a recording and/or reproducing apparatus, which is of the kind using a flexible disc and embodying the aspect of the present invention, comprises a recording and/or reproducing head which is movable in the radial direction of the flexible disc; and a disc stabilizing member which is situated opposite to the head through across the disc and is provided with a groove or recessed part formed along the moving path of the head, wherein the opening width of the groove or recessed part is arranged to be wider at the portion thereof located closest to the center of the disc than at the portion located closest to the outer periphery of the disc.

The groove or recessed part of the stabilizing member can be formed in various shapes as described in the following description of embodiments.

The above and further objects and features of the invention will become apparent from the following detailed description of preferred embodiments thereof taken in connection with the accompanying drawings.

BRIEF DESCRIPTION OF THE DRAWINGS

The preferred embodiments of the invention are arranged as shown in the accompanying drawings, in which.

DETAILED DESCRIPTION OF THE PREFERRED EMBODIMENTS

Figure 1:
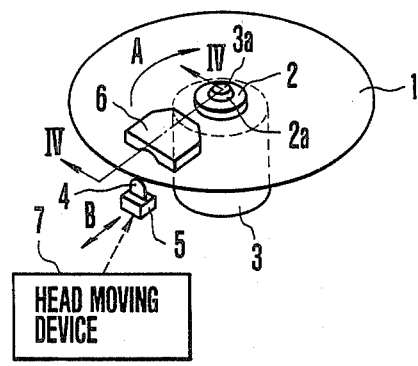
FIG. 1 is an oblique view schematically showing a recording and/or reproducing apparatus of the prior art using a flexible disc, and particularly showing the arrangement of parts thereof related to the present invention.
Figure 2:
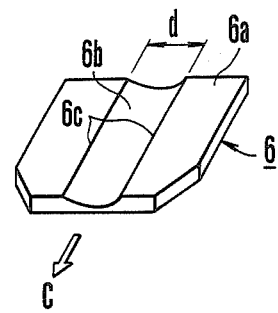
FIG. 2 is an oblique view showing a stabilizing member shown in FIG. 1 as viewed from the disc confronting side thereof.

Before a description of the embodiments of the present invention is provided, the conventional apparatus will be described. Referring to FIG. 1 which shows the conventional apparatus, a flexible disc 1 is a record bearing medium such as a magnetic disc. A center core 2, which is made of a plastic material, is secured to the middle part of the disc 1. The disc 1 is mounted on a spindle 3a of the disc rotating motor 3 at a center hole 2a of the center core 2 and is rotated, for example, in the direction of arrow A. A recording and/or reproducing head 4 is a magnetic head and is carried by a head carriage 5. The head carriage 5 is arranged to shift the position of the head 4 in the radial direction of the disc 1 as indicated by an arrow B in the drawing. A head moving device 7 is arranged to move the head carriage 5 in a known manner. In recording a signal, recording tracks are formed on the recording surface of the disc 1 in a concentric or helical shape. A plate-shaped stabilizing member 6 is situated opposite to the head 4 across the disc 1 for the purpose of stabilizing a portion of the disc 1 passing by the head 4, as described in the foregoing. FIG. 2 shows the details of this stabilizing member 6. As shown, the stabilizing member 6 is provided with a U-shaped groove or recessed part 6b which is arranged to avoid contact thereof with the head 4 and is formed with an unvarying opening width extending along the moving path of the head 4 in the direction of arrow B of FIG. 1. The term "opening" as used here means the opening of the groove or recessed part 6b defined by the edge lines 6c on the disc confronting surface 6a of the stabilizing member 6. This term will be used in the same meaning also for the description of embodiments of the invention which will be given later herein. An arrow C of FIG. 2 indicates the direction to which the center core 2 of the disc 1 is located. A similar stabilizing member of course may be arranged also on the side of the head 4, if necessary. The flexible disc-using apparatus of this kind has been disclosed, for example, in Japanese Laid-Open Patent Application No. SHO 58-57667, which corresponds to U.S. Pat. no. 4,466,502.

Figure 3A:
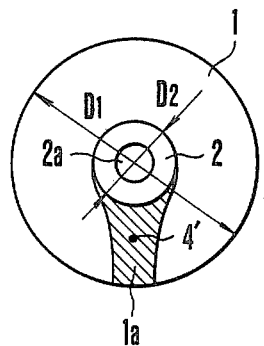
FIGS. 3(a) and 3(b) are plan and oblique views showing deformation of the disc caused by the protrusion of a recording and/or reproducing head.
Figure 3B:
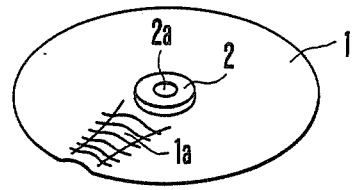

In the flexible disc-using apparatus, the stabilizing member 6 and, if necessary, another stabilizing member on the side of the head 4, are intended to stabilize the portion of the disc 1 passing by the head 4. However, according to experiments conducted by the inventors of the present invention, the protrusion of the head 4 toward the disc 1 deforms a portion of the disc 1 located at the head 4 as shown in FIGS. 3(a) and 3(b). This portion is deformed convexly on the upper side thereof, i.e. on the side at which the stabilizing member 6 is located and the width of the convex deformation increases toward the center of the disc and decreases toward the outer periphery thereof. This is believed to result from the influence of the center core 2 disposed in the middle part of the disc 1. The disc used for the experiments measured about 35 μm in thickness and 47 mm in diameter (D1=47 mm) and was prepared by applying magnetizable layers, each measuring about 1.5 to 2.5 μm in thickness, to both sides of a base material, which was a polyethylene terephthalate film. The disc 1 was provided with a center core 2 which was made of a plastic material and measured about 15 mm in diameter (D2=15 mm). Referring to FIG. 3(a), a point 4′ shows a position of the head 4, which, in this instance, is located approximately at the middle point of the recording area of the disc 1. The above-stated tendency was seen during the experiments with the head 4 shifted to other positions in the radial direction of the disc although the tendency varies in degree depending on the position.

Figure 4A:
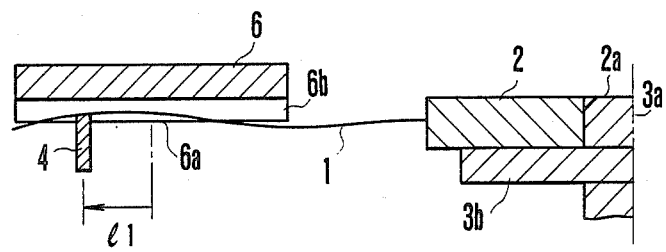
FIGS. 4(a), 4(b) and 4(c) are sectional views taken along a line IV—IV of FIG. 1 showing the head in various positions obtained by shifting the head radially relative to the disc.
Figure 4B:
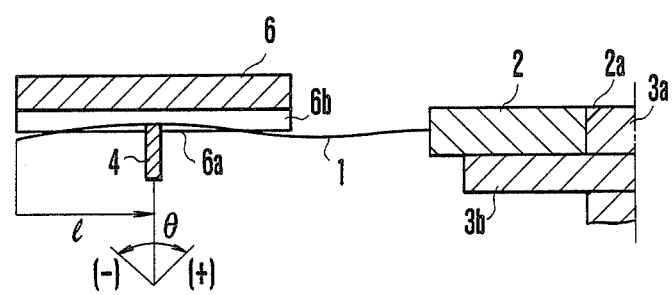
Figure 4C:
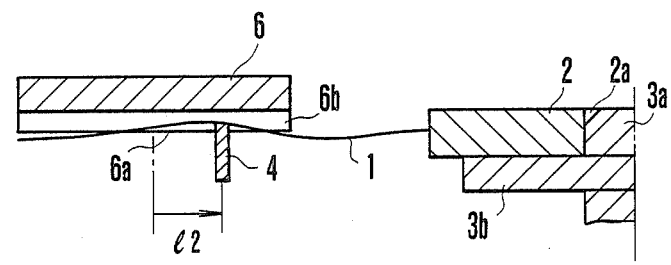

While the disc 1 is thus convexly deformed upward by the protrusion of the head 4 toward the disc 1 under the influence of the center core 2, when the stabilizing member 6, which is provided with the U-shaped recessed part 6b as shown in FIG. 2, is confronting the upper side of the disc 1 leaving a slight clearance between them, the edge lines 6c of the recessed part 6b of the stabilizing member 6 push down the disc 1 at a point close to the inner circumference of the disc 1, because the width of the deformed area of the disc 1 becomes wider than the opening width "d" of the recessed part 6b at that point. With the position of the head 4 shifted within a predetermined recording area on the disc 1, therefore, the confronting relation between the recording surface of the disc 1 and the fore end face of the head 4 is varied by the deformation of the disc 1, accordingly, as the head 4 shifts to or from a point of the recording area close to the outer periphery of the disc 1, a point in the middle of the recording area and a point close to the center of the disc 1. Under this condition, the recording or reproducing characteristic tends to greatly degrade when the head 4 is close to the middle of the disc as shown in FIG. 4(c) and close to the outer periphery thereof as shown in FIG. 4(a). In FIGS. 4(a)-4(c), a reference numeral 3b denotes a flange part which is formed in one unified body with a spindle 3a for the purpose of receiving the center core 2 of the disc 1.

In other words, against the deformation 1a of the disc 1, which takes place at the head 4 as shown in FIGS. 3(a) and 3(b), the stabilizing member 6, which is provided with the recessed part 6b having the unvarying opening width "d" according to the prior art, as shown in FIG. 2, thus has failed to sufficiently ensure a satisfactory confronting relation between the disc 1 and the head 4 with the head shifted to various radial positions relative to the disc 1.

The present invention is directed to the solution of this problem. The following description shows some embodiments of the present invention.

Figure 5:
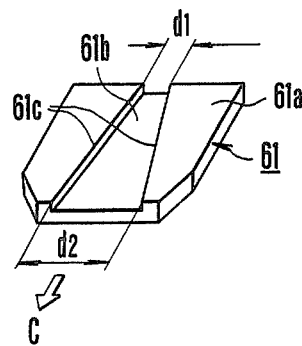
FIGS. 5, 6, 7, 8 and 9 are oblique views showing stabilizing members as viewed from their disc confronting sides with these members arranged as five different embodiments of the present invention.
Figure 6:
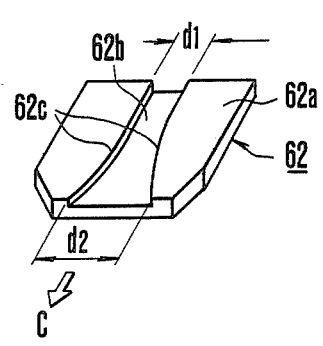

FIG. 5 shows a stabilizing member arranged according to the invention in a recording and/or reproducing apparatus using a flexible disc. The deformation of the disc 1 caused by the protrusion of the head 4 has a wider width closest to the center of rotation of the disc 1 and the width becomes narrower farther away from the center of the disc 1 as shown in FIG. 3. Accordingly, the U-shaped recessed part 61b which is formed in the disc confronting surface 61a of the plate-shaped stabilizing member 61 has an opening width which increases accordingly, as it is closer to the center of rotation of the disc 1 and decreases accordingly, as it is closer to the outer periphery of the disc 1 as indicated by an opening width d2 toward the center of disc 1 and another opening width d1(<d2) at the outer periphery of the disc 1. In this case, the recessed part 61b is arranged to have a rectangular sectional shape and to have straight edge lines 61c for the purpose of facilitating machining of the recessed part 61b. The use of the stabilizing member 61, which is provided with the recesses part 61b of the above-stated shape, serves to make uniform an air flow between the stabilizing member 61 and the disc 1. The confronting state between the head 4 and the disc 1, hence, becomes satisfactory at any shifted position of the head 4 to ensure satisfactory recording and reproduction. Further embodiments of the invention are as shown in FIGS. 6, 7, 8 and 9 and are arranged as follows:

FIG. 6 shows a stabilizing member 62 embodying the invention. A recessed part 62b, provided in the disc confronting surface 62a of the stabilizing member 62 is in a shape having two hyperbolic edge lines 62c corresponding to the pattern of deformation of the disc 1 shown in FIGS. 3(a) and 3(b).

Figure 7:
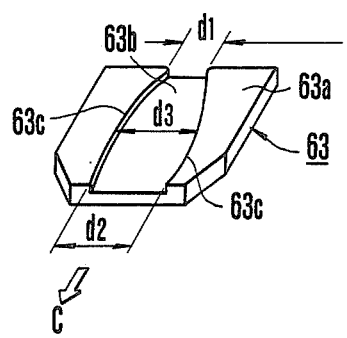

FIG. 7 shows a stabilizing member also embodying the invention. In this case, the opening width of a recessed part 63b formed in the disc confronting surface 63a is of a shape having a wider opening width in the middle portion thereof to ensure a satisfactory confronting state between the head 4 and the disc 1 in the middle portion of the recording area of the disc 1 where an air flow tends to cause an increased negative pressure. The edge lines 63c of the recessed part 63b in this case present a parabolic shape.

Figure 8:
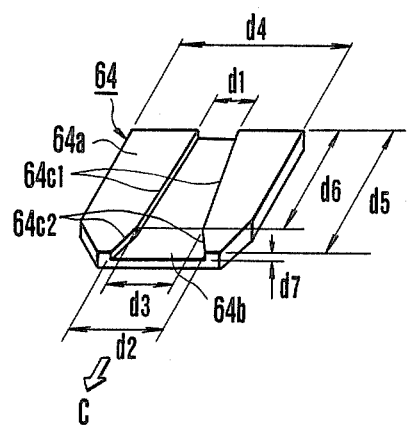

FIG. 8 shows a stabilizing member 64 embodying the invention as another example thereof. In this case, the recessed part 64b of the member 64 has a plurality of straight edge lines 64c1 and 64c2 to form a shape proximating to the shape of the recessed part 62b of the stabilizing member 62 shown in FIG. 6.

Figure 9:
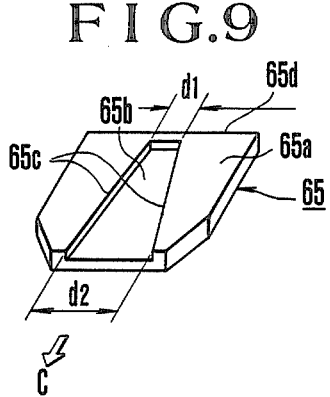

FIG. 9 shows another stabilizing member 65 embodying the invention as a further example thereof. The member 65 has a recessed part 65b formed with one end thereof close to the outer periphery of the disc 1, closed for the purpose of suppressing thereby peripheral vibration of the disc 1 which results from the rotation of the disc 1. With the exception of this point, the recessed part 65b is formed to have edge lines 65c in the same manner as the recessed part 61b shown in FIG. 5.

The stabilizing members 62, 63, 64 and 65 of FIGS. 6, 7, 8 and 9, respectively, give substantially the same advantageous effect of the invention as the one obtainable from the stabilizing member 61 which is shown in FIG. 5. The edge lines 65c of the recessed part 65b of the stabilizing member 65 shown in FIG. 9 may, of course, be changed to the hyperbolic shape, the parabolic shape or the bent straight line shape of the recessed part 62b, 63b or 64b of the stabilizing member 62, 63 or 64. Each of the recessed parts 61b–65b of the stabilizing members 61–65 shown in FIGS. 5–9 is formed in a rectangular cross-sectional shape. However, it goes without saying that the rectangular shape may be changed to an arcuate sectional shape like in the case of the recessed part 6b of the stabilizing member 6 of the prior art shown in FIG. 2. Further, the shape of the opening of each of the above-stated recessed parts 61b–65b may be determined either according to the shape of deformation of disc 1 which takes place when the head 4 is at the middle part of the recording area of the disc 1 as indicated by a reference numeral 4' or according to an averaged deformation pattern of the disc 1. The opening shape of the recessed part is not limited to the shapes shown in the accompanying drawings. In accordance with this invention, the recessed part may be formed to have edge lines of different shapes including many linear or curved shapes and combinations of linear and curved shapes as desired. The depth of the groove is determined on the basis of the degree of deformation of the disc 1. Generally, however, preferred depth of the groove is between 0.3 and 0.6 mm or thereabout.

It goes without saying that, in accordance with the invention, the stabilizing member 6 shown in FIG. 1 is replaced with any of the stabilizing members 61–65 shown in FIGS. 5–9 as these stabilizing members are to be used in a manner similar to the stabilizing member 6. Therefore, as mentioned in the foregoing, a stabilizing member can also be used on the same side of the disc 1 as the head 4 without degrading the advantageous effect of the invention. Further, in each of FIGS. 5–9, an arrow C indicates, in the same manner as in FIG. 2, a direction to which the center core 2 of the disc 1 is located.

Experiments were conducted to compare the effect of the stabilizing member 64 of the embodiment shown in FIG. 8 with that of the stabilizing member 6 of the prior art shown in FIG. 2. For the experiments, the magnetic disc 1 was prepared by forming a magnetizable layer of 1.5 to 2.5 $\mu$m thickness on each of two sides of a polyethylene terephthalate film base measuring about 35 $\mu$m in thickness and having a diameter D1=47 mm, or thereabout, as mentioned in the foregoing. A center core 2, which was made of a plastic material and had a diameter D2=15 mm, or thereabout, was secured to the middle part of the magnetic disc 1. The stabilizing members 6 and 64 were of the same size and made of the same material. The dimensions d4, d5 and d7 as shown in FIG. 8 were, respectively: d4=19.2 mm, d5≈12 mm and d7≈0.4–0.6 mm. Note that, in the case of the dimension d7 of the stabilizing member 6, it is a distance between the disc confronting surface 6a and the deepest point of the groove. These stabilizing members 6 and 64 were made of aluminum. The opening width "d" of the recessed part 6b of the stabilizing member 6 measured 6 mm. As for the shape of the recessed part 64b of the stabilizing member 64 which was arranged as shown in FIG. 8, its measurement was: d1≈6 mm, d2≈12 mm, d3≈9 mm and d6≈9.5 mm. With the head 4 not protruding to deform the disc 1, the stabilizing members 6 and 64 were at the same height above the rotating surface of the disc 1. Further, as shown in FIG. 4, the rear end of each of the stabilizing members 6 and 64 is arranged to approximately coincide with the outer periphery of the disc 1. The head 4 is arranged to protrude to an extent of about 50 $\mu$m from the rotating surface of the disc 1 or from the disc confronting surfaces 6a and 64a of the stabilizing members 6 and 64. A color television signal, according to the NTSC system, had been recorded in recording tracks on the disc 1 with one TV field portion of the signal arranged to correspond to one rotation turn of the disc 1. Under these conditions, the disc 1 was rotated by the motor 3 at 3,600 rpm relative to the head 4 and the stabilizing members 6 and 64. Then, the reproduction output of the head 4 was evaluated for each recording track. Further, at that time, a turning angle of the head 4 relative to the disc 1 at which the head 4 produces the best reproduction output for each recording track, as indicated by an angle $\theta$ in FIG. 4(b), was examined. The results of experiments were obtained for the different positions of the head 4 shown in FIGS. 4(a), 4(b) and 4(c). The results thus obtained are as shown in Table 1 including those of both the stabilizing members 6 and 64. Again referring to FIG. 4(b), a distance l is about 6.0 mm. In this instance, the head 4 is located approximately in the middle part of the predetermined recording area on the disc 1. In the cases of FIGS. 4(a) and 4(c), the head 4 is located at the opposite ends of the recording area at distances of l1 and l2 from the head position shown in FIG. 4(b). The distance l1 is equal to the distance l2 and is approximately 2.5 mm.

In the experiments, the turning angle of the head 4 is adjusted to have the best reproduction output of the head 4 obtainable with the head 4 in the position of FIG. 4(b). Table 1 shows the angles $\theta$ of adjustment required using the above-stated angle as a reference until the best reproduction output becomes obtainable with the head 4 located in the end positions shown in FIGS. 4(a) and 4(c).

TABLE 1

| | Position of the head 4 | | |
| --- | --- | --- | --- |
| | FIG. 4(a) | FIG. 4(b) | FIG. 4(c) |
| Stabilizing member 6 (FIG. 2) | $\theta = -5'$ | 0' | $\theta = +8'$ |
| Stabilizing member 64 (FIG. 8) | $\theta = -2'$ | 0' | $\theta = +2'$ |

In Table 1 above, the plus and minus signs are used with reference to the angle of the head in the position of FIG. 4(b). The sign "+" indicates a clockwise turning of the head 4 from its posture shown in FIG. 4(b) and the sign "−" indicates a counterclockwise turning of it. It is, of course, desirable to minimize variations in the turning angle of the head 4. From Table 1, it is apparent that the use of the stabilizing member 64 of FIG. 8, which is arranged according to the invention, resuls in considerable improvement in the confronting state between the head 4 and the deformed disc 1 as shown in FIG. 3. Table 1 shows the head positions of FIGS. 4(a) and 4(c) in contrast with the head position of FIG. 4(b), because the turning angle of the head 4 requires a maximum degree of adjustment at these head positions.

The recessed parts or grooves 61b-65b of the above-stated stabilizing members 61-65 are provided for the purpose of avoiding contact with the head 4. Therefore, it is permissible to have the atmospheric pressure at these parts. In view of this, these grooves or recessed parts may be arranged in the form of slots piercing the stabilizing members from their disc confronting side to the reverse side. The disc confronting sides 61a-65a thus may be provided with either cutout or recessed portions.

What is claimed is:

1. A record and/or reproducing apparatus using a disc-shaped flexible record-bearing medium, comprising:
    (a) rotation means for rotating the medium;
    (b) a recording and/or reproducing head arranged to confront a recording surface of the medium and movable in a radial direction of the medium; and
    (c) a stabilizing member arranged to confront another surface of the medium thereby sandwiching the medium between the stabilizing member and said head, said stabilizing member having a recessed portion formed therein extending along a path of movement of said head, a width of said recessed portion, in the radial direction of said medium, being larger at a central portion of the medium than a peripheral portion of the medium.

2. The apparatus according to claim 1, further comprising:
    moving means for moving said head in the radial direction of the medium.

3. The apparatus according to claim 1, wherein an opening of said recessed portion on the medium confronting surface of said stabilizing member is defined by 2n straight lines, wherein n is an integer.

4. The apparatus according to claim 3, wherein said recessed portion of the stabilizing member is open toward the outer periphery of the medium.

5. The apparatus according to claim 1, wherein a opening of said recessed portion of the medium confronting side of said stabilizing member is defined by 2n curved lines, wherein n is an integer.

6. A magnetic recording and/or reproducing apparatus using a flexible magnetic disc having a center core, comprising:
    (a) a spindle engageable with the center core of the disc for rotating the disc;
    (b) a magnetic head arranged to confront a recording surface of the disc and movable in a radial direction of the disc; and
    (c) a plate-shaped member arranged to sandwich the disc between the plate-shaped member and said head, said plate-shaped member having a surface thereof confronting another surface of the disc and having a recessed portion formed in said surface of the plate-shaped member extending along a path of movement of said head to avoid contact of the plate-shaped member with the head, a width of said recessed portion, in the radial direction of said medium, being larger at a central portion of the medium than at a peripheral portion of the medium.

7. The apparatus according to claim 6, wherein a opening of said recessed portion, which opens onto the disc confronting surface of the plate-shaped member is defined by 2n straight lines, wherein n represents an integer.

8. The apparatus according to claim 6, wherein a opening of said recessed portion, which opens onto the disc confronting surface of the plate-shaped member is defined by 2n curved lines, wherein n represents an integer.

9. A recording or reproducing apparatus having a recording or reproducing head which is shiftable in a radial direction of a flexible disc, and a stabilizing member, located opposite to said head across said disc, having formed therein a recessed part extending along a shifting path of said head, characterized in that said recessed part has a wider opening width, in the radial direction of said medium, at a central portion of said disc than at a peripheral portion of said disc.

10. An apparatus according to claim 9, wherein an edge of said recessed part is defined by at least one straight line.

11. An apparatus according to claim 9, wherein an edge of said recessed part is defined by at least one curved line.

12. A recording or reproducing apparatus having a recording/reproducing head and a stabilizing member for stabilizing a rotating motion of a flexible record-bearing disc, wherein said stabilizing member and said head are on opposing sides of said disc, said member comprises:
    a recessed part which is provided approximately in the middle part of said member for the purpose of avoiding contact with a recording or reproducing head, and is arranged to have a wider opening width, in the radial direction of said disc, at a central portion of said disc than at a peripheral portion of said disc.

13. An apparatus according to claim 12, wherein an edge of said recessed part is defined by at least one straight line.

14. An apparatus according to claim 12, wherein an edge of said recessed part is defined by at least one curved line.

15. A recording or reproducing apparatus haveing a recording/reproducing head and a stabilizing member for stabilizing a rotating motion of a flexible record-bearing disc, said head and said member being on opposing sides of said disc, wherein said stabilizing member is of a non-contact type with said disc, and comprises:
    a recessed part which is provided in said member for avoiding contact with said recording or reproducing head, wherein said recessed part has a variable shape in a radial direction of said disc, a width of said recessed part being wider at a central portion of said disc than a peripheral portion of said disc.

* * * * *